Patented Nov. 10, 1936

2,060,623

UNITED STATES PATENT OFFICE 2,060,623

PROCESS OF PREPARING ANGELIC ACID

Hans P. Kaufmann, Munster, Germany, assignor to Monsanto Chemical Company, St. Louis, Mo., a corporation of Delaware No Drawing. Application June 22, 1936, Serial No. 86,582. In Germany November 30, 1934

5 Claims. (Cl. 260—112)

The present invention relates to the preparation of angelic acid and it has particular relation to its preparation from readily available isomers thereof.

The main object of the invention is to provide simple and economical process of obtaining angelic acid in relatively high yield from certain relatively cheap and readily available materials.

Angelic acid (an alpha methyl crotonic acid) of the probable formula:

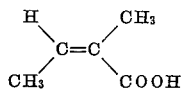

has heretofore been prepared from Roman-Camillie oil or by extraction from angelica roots by application of methods which were so costly as practically to inhibit commercial application of the acid. An isomeric form of alpha methyl crotonic acid known as tiglinic acid of the probable formula:

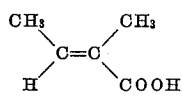

is readily available on the markets at a small fraction of the cost of angelic acid. The rearrangement of this isomer to form this, the more expensive angelic acid, would seem naturally to suggest itself to those skilled in the art. However, such reverse reaction or rearrangement does not occur under any treatment heretofore employed because apparently tiglinic is the stable form of alpha methyl crotonic acid. The two isomeric acids apparently are analogous to maleic and fumaric acids. These latter acids differ from each other merely in spatial or geometric arrangement. However, as is well-known, the fumaric acid constitutes the stable form and while the maleic acid is easily converted into fumaric acid, it is extremely difficult to reverse the reaction with any commercially significant degree of success.

The present invention is based upon the discovery that the beta brom angelic acid which is readily obtainable by treatment of tiglinic acid with bromine and subsequently elimination of one atom of bromine as hydrobromic acid may readily be converted into angelic acid in high yield by treatment, preferably with nascent hydrogen. The preparation of di brom tiglinic acid from tiglinic acid is described in Annalen, 195, page 122 (1879) and also in Annalen 250, page 244 (1888). The transformation of this compound into beta brom angelic acid is described in Annalen 313, page 246 (1900). The reactions involved in the conversion of tiglinic acid into angelic acid in accordance with the provision of the present invention may be shown by chemical equation as follows:

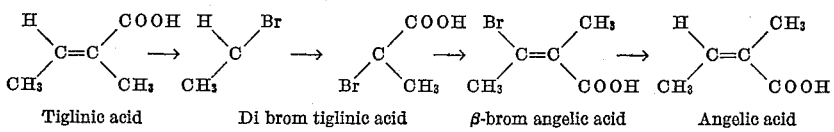

Tiglinic acid  Di brom tiglinic acid  β-brom angelic acid  Angelic acid

One method of preparing angelic acid from beta brom angelic acid, involves the treatment of the beta brom acid with caustic and zinc dust. The beta brom angelic acid in the ratio of 4 parts by weight is dissolved in 50 parts by weight of 20% caustic soda and 10 parts of zinc dust are then added. The mixture is allowed to stand for several days and is then acidified by means of a suitable acid, e. g. hydrochloric acid or the like. The reaction product first separates out as an oil, but when left standing for a considerable period of time it crystallizes out and it may be purified by repeated crystallizations.

Another and somewhat more satisfactory method of procedure involves the treatment of beta brom angelic acid with sodium amalgam which may be prepared from 80 parts of sodium and 800 parts of mercury. It is added, with cooling, to 40 parts of beta brom angelic acid which is contained in 300 parts of water. The mixture is slowly stirred until the amalgam is used up. Upon acidification of the solution angelic acid, having a melting point of 45° C., separates. Some of the angelic acid remains in the solution and may be recovered by extraction with ether. Approximately 70% complete conversion is obtained.

The materials employed in conducting these reactions may be obtained at a relatively slight expense and the reaction involved is of comparatively simple nature. The yields obtained are also comparatively high. Accordingly the process provides a means of obtaining angelic acid at a fraction of the cost heretofore involved in its preparation. Angelic acid is an intermediate in the preparation of soporifics of various types. Esters of angelic acid may be prepared by esterification of the acid per se or by esterification of the intermediate acids before treatment with hydrogen. Angelic acid and its ester may be polymerized to form resin-like materials.

Although only the preferred forms of the invention have been described, it will be apparent to those skilled in the art that the invention is not limited thereto and that numerous modifications may be made therein without departure from the spirit of the invention or the scope of the appended claims.

What I claim is:

1. A process of preparing angelic acid which consists in reducing beta brom angelic acid with nascent hydrogen.

2. A process of producing angelic acid which consists in reducing beta brom angelic acid by the application of sodium amalgam in the presence of water.

3. A process of preparing angelic acid which comprises brominating tiglinic acid to form di brom tiglinic acid, converting the di brom tiglinic acid into beta brom angelic acid and subsequently reducing the beta brom angelic acid to angelic acid.

4. A process as defined in claim 3 in which the reduction is effected by application of hydrogen in nascent state.

5. A process as defined in claim 3 in which the reduction of beta brom angelic acid is effected by application of sodium amalgam.

HANS P. KAUFMANN.